Nov. 11, 1924.
J. R. BARTHOLOMEW
1,514,684
AUTOMOTIVE BRAKE DEVICE
Filed Oct. 4, 1922
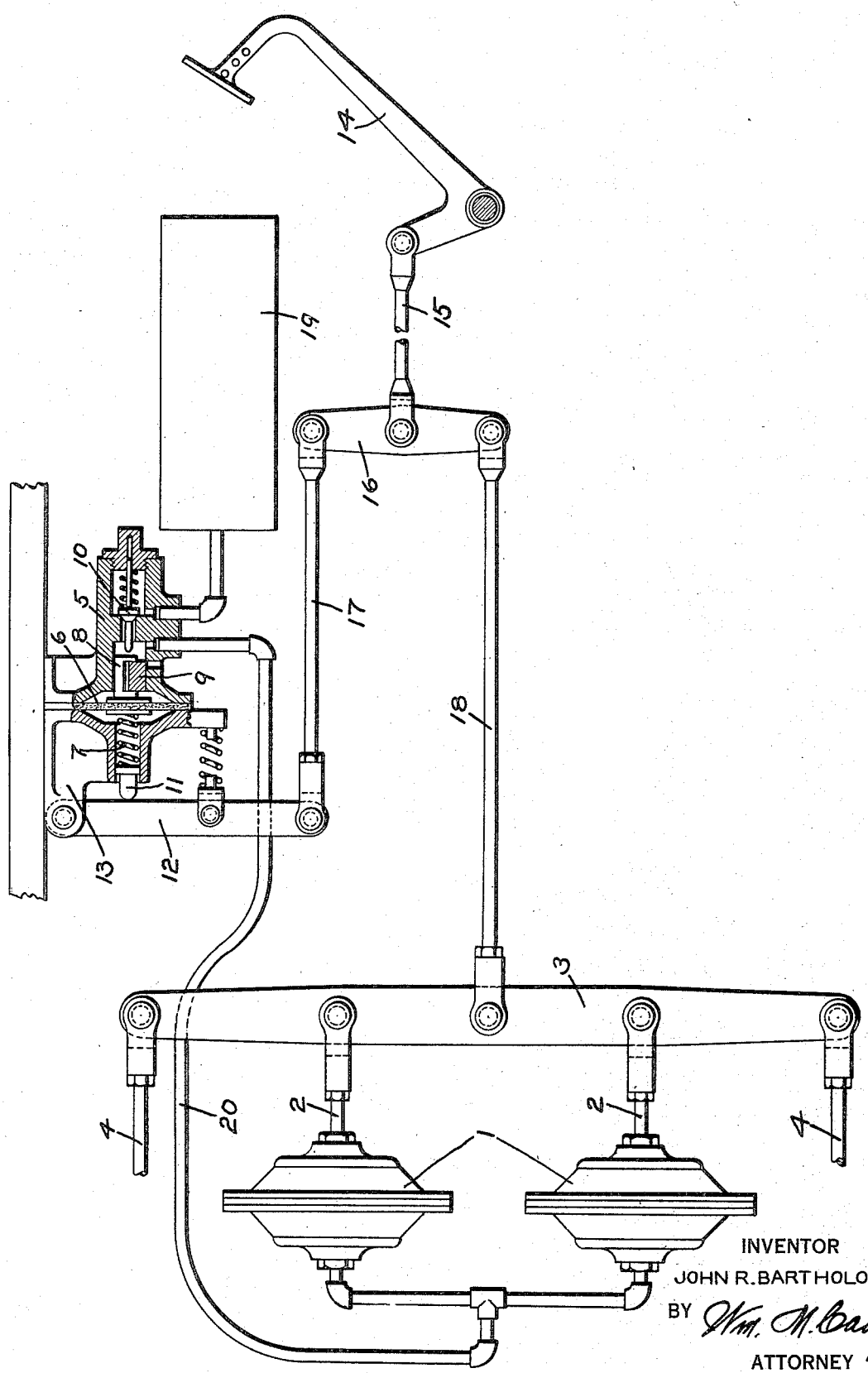
INVENTOR
JOHN R. BARTHOLOMEW
BY *Wm. M. Cady*
ATTORNEY Patented Nov. 11, 1924.

1,514,684

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed October 4, 1922. Serial No. 592,240.

*To all whom it may concern:*

Be it known that I, JOHN R. BARTHOLOMEW, a citizen of the United States, residing at Berkeley, in the county of Alameda and State of California, have invented new and useful Improvements in Automotive Brake Devices, of which the following is a specification.

This invention relates to brakes adapted for motor vehicles, and more particularly to a combined fluid pressure and mechanically operated brake.

The principal object of my invention is to provide an improved brake of the above character.

Other objects and advantages will appear in the following more detailed description of the invention.

In the accompanying drawing, the single figure is a diagrammatic view of a motor vehicle brake equipment embodying my invention.

As shown in the drawing, the brake equipment may comprise one or more diaphragm brake chambers 1, each containing a flexible diaphragm (not shown) for operating push rods 2 which are connected to an equalizing bar 3. Brake pull rods 4 are pivotally connected to opposite ends of the equalizing bar 3 and are operated by movement of the bar 3 to control the application and release of the brakes.

For controlling the brakes by fluid under pressure, a valve device may be provided comprising a casing 5 having a diaphragm chamber containing a flexible diaphragm 6, subject on one side to the pressure of a coil spring 7 and having a stem 8 secured to the opposite side for operating a release slide valve 9 and a fluid pressure supply valve 10. A movable member 11 engages the spring 7 and is adapted to be moved, so as to compress the spring, by a lever 12 pivotally mounted on a bracket 13 carried by the casing 5.

A pedal lever 14 is provided, which is pivotally connected to a link 15 and said link is pivotally connected to the central portion of a cross bar 16. One end of the cross bar 16 is connected through a link or pull rod 17 with the lever 12 and the other end of the bar 16 is connected through a pull rod 18 with the equalizing bar 3.

In operation, if it is desired to effect an application of the brakes on the vehicle, the pedal lever 14 is depressed by the foot of the operator, so that the link 15 will be pulled toward the right. Since the pressure required to operate the movable member 11 in compressing spring 7 is much less than that required to operate the brakes mechanically through the pull rod 18, the rod 18 will act as a fulcrum during the first movement of the pedal lever 14, so that the movement of link 15 will be transmitted through the cross member 16 to the pull rod 17 and thereby the lever 12 will be moved to actuate the movable member 11 and compress the spring 7. The diaphragm 6 is then operated by the pressure of spring 7 to open the supply valve 10 and thus admit fluid under pressure from a reservoir 19 to pipe 20, leading to the brake chambers 1.

If, for any reason, the fluid pressure brake fails to act, a further depression of the pedal lever 14 will cause movement of the cross member 16 with the pull rod 17 acting as a fulcrum, so that the rod 18 will be pulled to the right and the equalizing bar 3 will be operated mechanically to apply the brakes.

It will now be seen that the brakes are normally applied by fluid pressure upon movement of the pedal lever 14, but if the fluid pressure brake fails, then the continued movement of the pedal lever will apply the brakes mechanically.

It will be understood that the manual control may be effected by mechanism adapted to be operated either by the hand or the foot of the operator.

Having now described my invention, what I claim as new and desire to secure by Letters Patent, is:—

1. In an automotive brake, the combination with a brake applying member, of fluid pressure means for operating said brake applying member including a valve device, a member for operating said valve device, a member for mechanically operating said brake applying member, a manually operated device, and a cross arm having its opposite ends pivotally connected to said valve device operating member and to said mechanical operating member and operatively connected at a point intermediate said ends to said manually operated device.

2. In an automotive brake, the combination with a fluid pressure brake, a pull rod for controlling the operation of said brake, and a pull rod for mechanically controlling the brakes, of a cross arm pivotally connected to said pull rods and a pedal lever operatively connected to said cross arm at a point intermediate said pull rods.

3. In an automotive brake, the combination with a brake applying member, a brake chamber for operating said member by fluid under pressure, and a valve device for controlling the fluid pressure to said brake chamber, of a pull rod for operating said valve device, a pull rod for mechanically operating said brake applying member, a cross member having its opposite ends pivotally connected to said pull rods, and a pedal lever operatively connected to said cross member at a point intermediate said ends.

In testimony whereof I have hereunto set my hand.

JOHN R. BARTHOLOMEW.